J. B. HOAG.
VERTICALLY ADJUSTABLE GATE.
APPLICATION FILED MAR. 26, 1914.
1,114,613.
Patented Oct. 20, 1914.
2 SHEETS—SHEET 1.
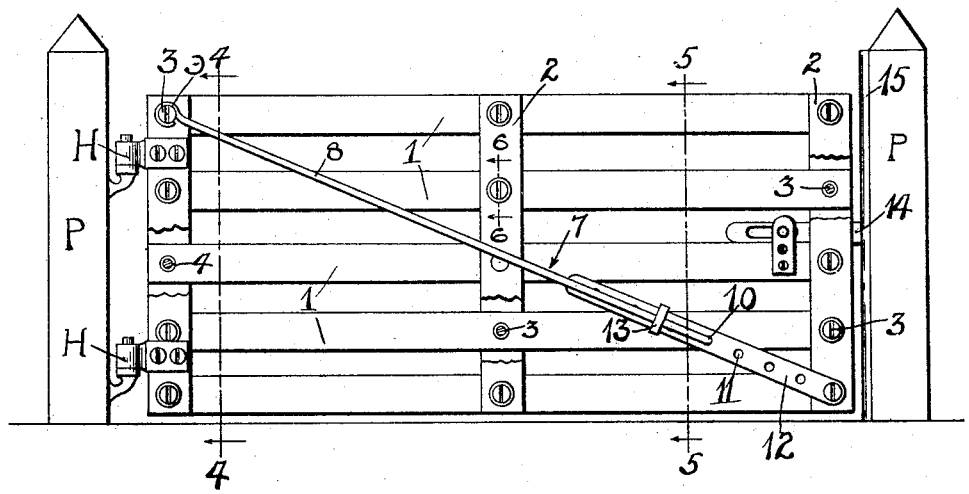
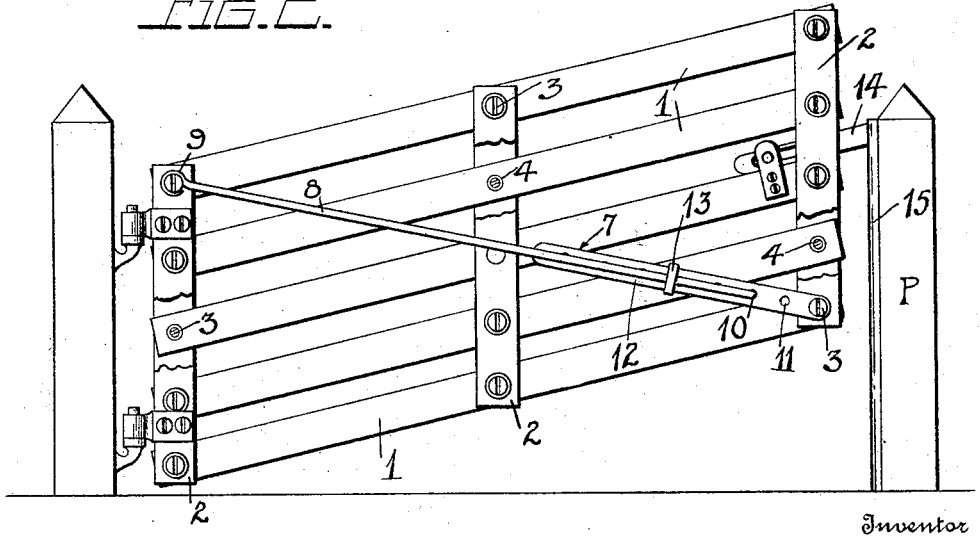
Witnesses
Inventor
John B. Hoag.
By Attorneys J. B. HOAG.
VERTICALLY ADJUSTABLE GATE.
APPLICATION FILED MAR. 26, 1914.
1,114,613.
Patented Oct. 20, 1914.
2 SHEETS—SHEET 2.
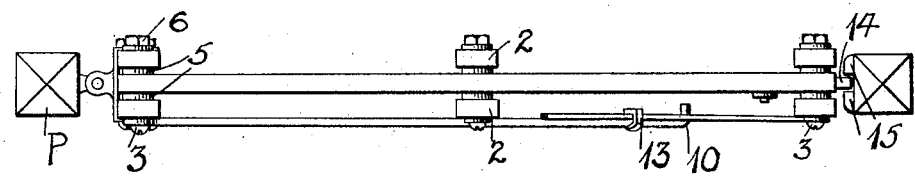
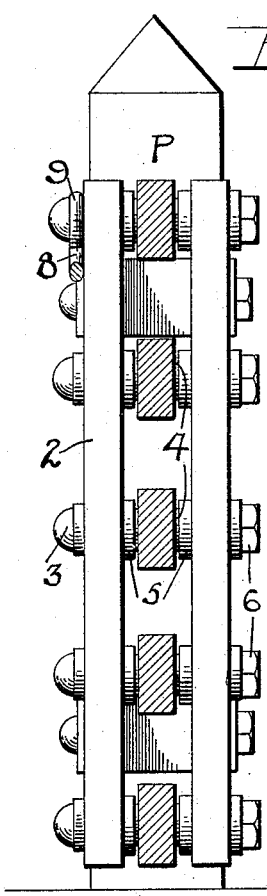
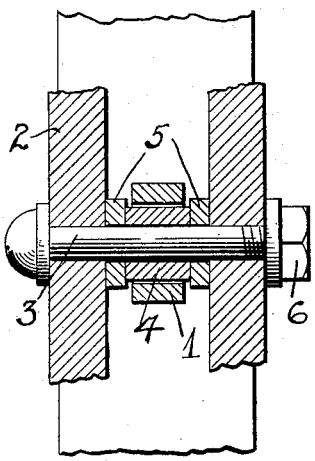
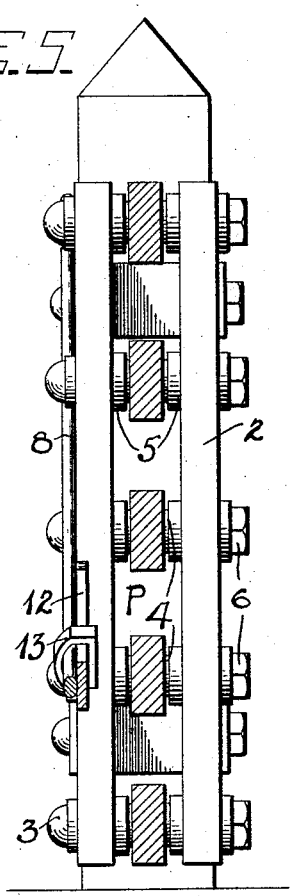
Witnesses
Inventor
John B. Hoag
By Attorneys

UNITED STATES PATENT OFFICE.

JOHN B. HOAG, OF KIRKSVILLE, MISSOURI.

VERTICALLY-ADJUSTABLE GATE.

1,114,613.  Specification of Letters Patent.  Patented Oct. 20, 1914.

Application filed March 26, 1914. Serial No. 827,402.

*To all whom it may concern:*

Be it known that I, JOHN B. HOAG, a citizen of the United States, residing at Kirksville, in the county of Adair and State of Missouri, have invented certain new and useful Improvements in Vertically-Adjustable Gates; and I do declare the following to be a full, clear, and exact description of the invention, such as will enable others skilled in the art to which it appertains to make and use the same.

My invention relates to improvements in farm gates and more particularly to those which comprise a number of upright and lateral bars connected for parallelogrammatic movement.

The primary object of the invention is to provide a simply constructed gate of this character which will effectually perform the function for which it is designed.

A secondary object of the invention is to provide simple and efficient means for retaining the gate in any one of its adjusted positions.

With the above and other minor objects in view, the invention resides in certain novel features of construction and combination herein described and claimed and shown in the drawings wherein:

Figure 1 is a side elevation of my improved gate showing the same in lowered position; Fig. 2 is a similar view showing the gate raised; Fig. 3 is a top plan view with the parts in the position shown in Fig. 1; Figs. 4 and 5 are vertical transverse sections taken on the lines 4—4 and 5—5, respectively of Fig. 1; and Fig. 6 is a detail transverse section taken on the line 6—6 of Fig. 1, and showing more particularly the pivotal connection between the upright and lateral bars of the gate.

In the accompanying drawings, I have shown the gate proper as constructed of a plurality of transverse longitudinal bars 1 which are pivotally mounted between upright bars 2, the pivotal connections between said bars including transverse pivot bolts 3 which project through the spaced upright bars 2, through sleeves 4, and washers 5, said washers being disposed between each end of the sleeve 4 and the contiguous sides of the bars 2. When in this position, nuts 6 are tightened upon the ends of the bolts 3, thereby rigidly spacing the upright bars 2 and holding the sleeves 4 against rotation. It is upon said sleeves 4 that the longitudinal bars 1 are loosely mounted, thereby allowing the proper movement of the gate without unnecessary friction.

For the purpose of retaining the gate in any one of its adjusted positions, I provide an adjustable brace bar 7, said brace bar including a rod 8 having an eye 9 formed at one end, while its opposite end is bent laterally as at 10 to form a stud for engagement with any one of a series of openings 11 formed in a flat metal bar 12, which constitute the other section of said bar. As clearly shown in the drawings, the eye 9 is pivoted beneath the head of the bolt 3 which is located at the top of the innermost upright bars 2, while the outer end of the bar 12 is pivoted beneath the head of the lowermost bolt 3 at the lower end of the outermost bars 2. By this positioning and arrangement of parts, when the outer end of the gate is raised, the distance between the corners thereof to which the opposite ends of the brace bars 7 are pivoted, will, of course, diminish, thus allowing the stud 10 to be engaged with certain of the openings 11 for retaining the gate in raised position. For the purpose of preventing accidental removal of the stud 10 from the openings 11, I provide a substantially elliptical ring 13 which embraces the rod 8 and the bar 12 and is held by frictional contact, until manually moved.

Any suitable form of latch may be employed in connection with the features so far described, a sliding bolt 14 adapted to rise between upright strips 15 carried by one of the gate posts P being here shown. The hinges H may also be of any suitable construction and form no part of the present invention.

From the foregoing description, taken in connection with the accompanying drawings, the construction and operation of the invention will be readily understood without requiring a more extended explanation.

Various changes in form, proportion, and the minor details, may be resorted to without departing from the spirit or sacrificing any of the advantages of the invention.

Having thus described my invention, what I claim as new and desire to secure by Letters Patent is:

The combination with a gate comprising a number of upright and transverse bars pivoted for parallelogrammatic movement, of a sectional brace bar including a flat metal bar having longitudinally spaced openings and pivoted to one of the corners of the gate and a rod pivoted to the diagonally opposite corner of the gate and having a lateral stud for engagement with said openings and a clip embracing said bar and rod for preventing the removal of the stud.

In testimony whereof I have hereunto set my hand in presence of two subscribing witnesses.

JOHN B. HOAG.

Witnesses:
 ALEXANDER DOMZKY,
 WILBER A. KEYTE.

Copies of this patent may be obtained for five cents each, by addressing the "Commissioner of Patents, Washington, D. C."